(12) United States Patent
Nakayasu (10) Patent No.: US 8,667,897 B2
(45) Date of Patent: Mar. 11, 2014

(54) GAS GENERATOR

(75) Inventor: Masayuki Nakayasu, Hyogo (JP)

(73) Assignee: Daicel Corporation, Osaka (JP)

( * ) Notice: Subject to any disclaimer, the term of this patent is extended or adjusted under 35 U.S.C. 154(b) by 42 days.

(21) Appl. No.: 13/239,119

(22) Filed: Sep. 21, 2011

(65) Prior Publication Data

US 2012/0079958 A1 Apr. 5, 2012

Related U.S. Application Data

(60) Provisional application No. 61/389,077, filed on Oct. 1, 2010.

(30) Foreign Application Priority Data

Oct. 1, 2010 (JP) .................................. 2010-223851

(51) Int. Cl.
*B60R 21/26* (2011.01)

(52) U.S. Cl.
USPC ........................................ 102/530; 280/737

(58) Field of Classification Search
USPC .......... 102/530, 531; 280/736, 737, 740, 741, 280/742
See application file for complete search history.

(56) References Cited

U.S. PATENT DOCUMENTS

| | | | |
|---|---|---|---|
| 5,582,426 A | 12/1996 | O'Loughlin et al. | |
| 5,762,368 A * | 6/1998 | Faigle et al. | ................. 280/737 |
| 5,941,563 A | 8/1999 | Schoenborn | |
| 6,237,950 B1 | 5/2001 | Cook et al. | |
| 6,273,462 B1 * | 8/2001 | Faigle et al. | ................. 280/737 |

(Continued)

FOREIGN PATENT DOCUMENTS

| | | |
|---|---|---|
| EP | 1 544 060 A1 | 6/2005 |
| EP | 1 449 724 B1 | 5/2008 |

(Continued)

OTHER PUBLICATIONS

International Search Report and Written Opinion issued in International Application No. PCT/JP2011/070676 on Nov. 30, 2011.

*Primary Examiner* — James Bergin
(74) *Attorney, Agent, or Firm* — Birch, Stewart, Kolasch & Birch, LLP (57) ABSTRACT

A gas generator includes a housing and a diffuser connected to the housing. The diffuser has a cup-like shape and includes an opening portion joined to the housing and a circumferential wall portion provided with gas discharge ports. A partition plate is attached to the opening between the housing and the diffuser for closing the opening. The diffuser has first and second tubular space portions therein communicating with each other, the first tubular space portion facing the partition plate, and the second tubular space portion communicating with the gas discharge ports. A step is formed between the first and second tubular space portions such that the inner diameter of the first tubular space portion is larger than the inner diameter of the second tubular space portion, and a cross-sectional area of the second tubular space portion is smaller than the total opening area of the gas discharge ports.

9 Claims, 3 Drawing Sheets

(56) References Cited

U.S. PATENT DOCUMENTS

| | | | |
|---|---|---|---|
| 6,382,668 B1* | 5/2002 | Goetz | 280/737 |
| 7,134,689 B2* | 11/2006 | Matsuda et al. | 280/736 |
| 7,360,788 B2* | 4/2008 | Yano et al. | 280/737 |
| 7,419,183 B2* | 9/2008 | Tokuda et al. | 280/737 |
| 7,431,337 B2* | 10/2008 | Matsuda et al. | 280/741 |
| 7,540,306 B2* | 6/2009 | Matsuda et al. | 141/3 |
| 8,052,169 B2* | 11/2011 | Yano et al. | 280/737 |
| 2005/0146123 A1 | 7/2005 | Bergmann et al. | |
| 2008/0136153 A1 | 6/2008 | Yamashita et al. | |

FOREIGN PATENT DOCUMENTS

| | | |
|---|---|---|
| JP | 3129859 U | 3/2007 |
| JP | 2008-137475 A | 6/2008 |
| WO | WO 2010/130279 A1 | 11/2010 |

* cited by examiner

GAS GENERATOR

This nonprovisional application claims priority under 35 U.S.C. §119(a) to Patent Application No. 2010-223851 filed in Japan on 1 Oct. 2011, and 35 U.S.C. §119(e) to U.S. Provisional Application No. 61/389,077 filed on 1 Oct. 2011, both of which are incorporated by reference.

BACKGROUND OF THE INVENTION

1. Field of Invention

The present invention relates to a gas generator suitable for a restraining system for a vehicle.

2. Description of the Related Art

A gas generator for an air bag apparatus supplies a predetermined amount of gas to an airbag during activation. The amount of supplied gas is determined by the use of the airbag and specifications thereof. Therefore, a gas generator demonstrating a stable output is desired.

The amount of gas discharged per unit time from the gas generator is adjusted by a choke portion in a gas discharge path. The choke portion is the portion with the smallest cross-sectional area or opening area (minimum-area portion) in the discharge path to gas discharge ports. Therefore, it is necessary that the minimum-area portion be stably ensured at all times.

U.S. Pat. No. 5,941,563 discloses a partial view of a gas generator in which a diffuser 12 is attached to the end portion of a housing 14. The diffuser 12 has a ceiling portion 24, a side wall 22, and a bottom wall 26. The ceiling portion 24 is closed and a plurality of openings (slots 40) are formed in the side wall 22. Further, a single hole 28 is formed in the center of the bottom wall 26 and closed by a burst disk 34.

In this gas generator, the total opening area of the plurality of openings 40 is larger than the opening area of the hole 28 formed in the bottom wall 26 of the diffuser 12. Therefore, the hole 28 is the choke portion.

JP utility model registration publication JP-U No. 3129859 discloses a gas generator provided with an elongated cylindrical housing having a filter inside thereof, a combustion chamber charged therein with a gas generating agent to generate gas, a gas generating agent ignition device, and a gas discharge pipe mounted on the end portion of the housing on the filter side, wherein the cross-sectional surface area of the gas passageway opening in the gas discharge pipe is larger than the cross-sectional area of the intermediate section of the gas passage way (claim 1).

The cross-sectional area of the gas discharge pipe is described in detail in paragraph [0017], but the relationship with the total opening area of a plurality of gas discharge holes is not descried at all. Further, as described in paragraph [0021], the relationship of cross-sectional area described in paragraph [0017] is selected such that even the vicinity of the corners of the filter 4 on the gas discharge pipe 12 side can be used effectively as well.

SUMMARY OF INVENTION

The present invention provides a gas generator including:

a main housing (housing main body portion) accommodating at least one of a gas and a gas generating means for generating a gas, a diffuser portion connected to the main housing and discharging a gas located inside the main housing or a gas generated inside the main housing, the diffuser portion having a cup-like shape and including an opening portion joined to the main housing and a circumferential wall portion provided with a plurality of gas discharge ports, a partition plate being fixedly attached to an annular portion on a side of the opening portion and closing between the housing main portion and the diffuser portion, the inside of the diffuser portion having a first tubular space portion and a second tubular space portion communicating with each other, the first tubular space portion facing the partition plate, and the second tubular space portion communicating with the gas discharge ports, the first tubular space portion and the second tubular space portion being communicated with each other and provided with a step such that the inner diameter d1 of the first tubular space portion and the inner diameter d2 of the second tubular space portion satisfy the relationship d1>d2, and a cross-sectional area a1 of the second tubular space portion with the inner diameter d2 is set to be less than the total opening area a2 of the gas discharge ports.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DETAILED DESCRIPTION OF INVENTION

In the invention disclosed in U.S. Pat. No. 5,941,563, the amount of released gas is adjusted by the hole 28 serving as a choke potion. However, the burst disk 34 is attached to the hole 28, and the opening area of the hole 28 can be found to vary depending on cleavage of the burst disk 34. Therefore, output performance varies easily, and there is still room for improvement to obtain gas generator with a stable output performance.

The present invention provides a gas generator having a diffuser portion formed with a plurality of gas discharge ports, wherein a space portion, which serves as a choke portion formed in part of a gas discharge path leading to a gas discharge ports, functions to stably adjust a gas discharge amount, regardless of the actuation state of the gas generator. The present invention relates to a gas generator suitable for a restraining system for a vehicle.

The present invention provides the following embodiments 2 to 6.

2. The invention gas generator, wherein a length of the first tubular space portion (a length from an opening portion in the first tubular space portion facing the partition plate, to the step) L1 and the inner diameter d1 of the first tubular space portion satisfy the relationship L1>0.5d1.

3. The invention gas generator, wherein the partition plate has a plurality of weak portions formed radially from a central portion thereof.

4. The invention gas generator, wherein the gas generator is a stored-gas-type inflator that uses the gas filled in the main housing.

5. The invention gas generator, wherein the gas generator is a hybrid-type inflator that uses the gas and a gas generating agent charged in the main housing.

6. The invention gas generator, wherein the gas generator is a pyrotechnic-type inflator that uses a gas generating agent charged in the main housing.

With the exception of the diffuser portion, the gas generator in accordance with the present invention can be similar to known gas generators of various types, provided that the present invention can still be attained.

Further, the diffuser portion in the gas generator in accordance with the present invention can be also replaced with the components that have the diffusing function in the known gas generators.

The gas generator in accordance with the present invention can be of any type from among:

a stored-gas-type inflator that uses the gas filled in the main housing (however, at least an igniter or the like is provided to rupture the partition plate by a pressure, or to drive a member (projectile, piston, or the like) that breaks the partition plate by directly acting thereupon);

a hybrid-type inflator that uses the gas and gas generating agent charged into the main housing (a gas generating device such as an igniter is provided for igniting and burning the gas generating agent); and a pyrotechnic-type inflator that uses the gas generating agent charged into the main housing.

The main housing accommodates at least one of the gas and the gas generating means to generate gas, in the inner space thereof.

The gas is known inert gas, nitrogen gas, or the like, which is used in the stored-gas-type inflators and the hybrid-type inflators.

Gas generating means is the one used for pyrotechnic-type inflators and hybrid-type inflators. The gas generating means uses the component selected, in accordance with an inflator type, among a gas generating agent, an igniter for igniting and burning the agent, a transfer charge (inclusive of another gas generating agent) for promoting ignition and combustion of the gas generating agent, and the like in combination. Gas generating means used in known gas generators can be used.

The partition plate closes between the main housing and the diffuser portion.

The partition plate in the stored-gas-type inflators and the hybrid-type inflators serves to prevent leak of the gas filled under a high pressure into the main housing. Since the partition plate is fixedly attached in a state in which the plate receives a high pressure, a material and thickness of the plate have to withstand this pressure. Metals are preferred.

The partition plate in the pyrotechnic-type inflators separates the charging space of the gas generating agent inside the main housing from the outer atmosphere and prevents the penetration of moist air (examples of a gas generating agent are in a round columnar shape, a disk shape, a pellet shape and the aforementioned shapes having through holes or recesses formed therein). Therefore, the partition plate the pyrotechnic-type inflator may have a strength lower than that of the stored-gas-type inflator or the hybrid-type inflator.

Inside the diffuser portion, the first tubular space portion and the second tubular space portion are juxtaposed in the axial direction of the diffuser portion. The first tubular space portion faces the partition plate, and the second tubular space portion communicates with the gas discharge ports.

Therefore, when the partition plate is ruptured at the time of actuation, the gas inside the main housing (or the gas generated inside the main housing) successively passes through the first tubular space portion and second tubular space portion and is discharged from the gas discharge ports.

The first tubular space portion and the second tubular space portion are communicated with each other and provided with a step such that an inner diameter d1 of the first tubular space portion and an inner diameter d2 of the second tubular space portion satisfy the relationship d1>d2. In this case, the central axis of the first tubular space portion coincides with the central axis of the second tubular space portion.

A cross-sectional area a1 of the second tubular space portion with the inner diameter d2 is set to be less than the total opening area a2 of the plurality of gas discharge ports. Since the inner diameter d1 of the first tubular space portion and the inner diameter d2 of the second tubular space portion satisfy the condition d1>d2, when the gas generator is actuated, the second tubular space portion with the inner diameter d2 serves as a choke portion for adjusting the gas discharge amount per unit time.

The length of the first tubular space portion (a length from an opening portion in the first tubular space portion facing the partition plate, to the step) L1 and the inner diameter d1 of the first tubular space portion preferably satisfy the relationship L1>0.5d1. In this case, the diameter of the partition plate facing the first tubular space portion depends on the attachment state to the opening 103, but is almost equal to the inner diameter d1 of the first tubular space portion.

In the case of the stored-gas-type inflators or the hybrid-type inflators, since an inert gas or the like is filled under a high pressure into the main housing, the partition plate bulges in a bowl-like form toward the diffuser portion. In this case, the highest pressure is applied to the central portion of the partition plate. Therefore, when the partition plate is ruptured, cracks spread radially from the central portion and petal-like rupture proceeds, while the circumferential edge portion remains fixed.

In this case, where the distal end portion of the partition plate that has spread in a petal-like form reaches the second tubular space portion, the cross-section area of the second tubular space portion can decrease and the output performance of the inflator can change.

However, where the relationship L1>0.5d1 is satisfied, as mentioned hereinabove, the distal end portion of the petal-like spread partition plate is prevented from reaching the second tubular space portion and therefore the function of a choke portion having the designed cross-sectional area is obtained.

When a plate having a plurality of weak portions provided radially from the central portion is used as the partition plate, petal-like cleaving is facilitated and ruptured pieces are unlikely to occur. Therefore, such a configuration is preferred because the choke function of the second tubular space portion can be demonstrated with better stability.

In the gas generator in accordance with the present invention, a choke portion, that adjusts the gas discharge amount per unit time in the gas discharging path, is formed in the second tubular space portion inside the diffuser portion. The diffuser portion is provided with the first tubular space portion and the second tubular space portion that have the different diameters from each other, and the partition plate is fixed to the opening of the first tubular space portion. Therefore, the partition plate that has been cleaved at the time of actuation does not enter the second tubular space portion, which is the choke portion, and a stable adjustment function of gas discharge amount is demonstrated.

EMBODIMENTS OF INVENTION

(1) Hybrid-Type Inflator

An embodiment in which the gas generator in accordance with the present invention is used as a hybrid-type inflator will be explained below with reference to FIGS. 1 to 3.

Figure 1:
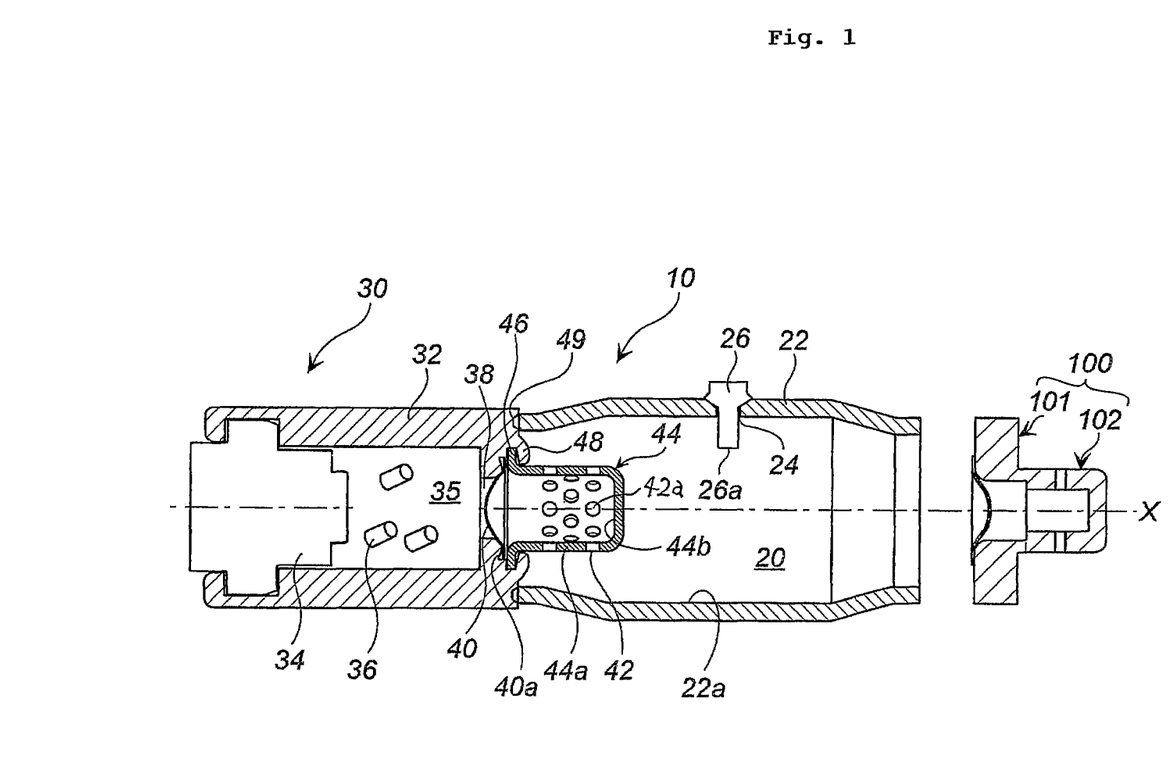
FIG. 1 shows an axial sectional view for explaining a method for assembling the gas generator in accordance with the present invention.

FIG. 1 illustrates a state before a diffuser portion 100 is newly attached to the configuration substantially identical to that obtained by removing a diffuser portion 50 in an inflator 10 shown in FIG. 1 of JP-A No. 2008-137475.

The inflator 10 has a pressurized gas chamber 20, a gas generator 30, and a diffuser portion 100.

In the pressurized gas chamber 20, an outer shell is formed by a tubular pressurized gas chamber housing (main housing) 22 and filled with a pressurized gas including a mixture of argon and/or helium. Since the pressurized gas chamber housing 22 is symmetrical with respect to the axial direction and the radial direction, it is not necessary to adjust the orientation in the axial direction and the radial direction at the assembling stage.

A pressurizing gas charging hole 24 is formed in a side wall of the pressurized gas chamber housing 22, and the charging hole is closed with a pin 26 after the pressurized gas has been charged. A distal end portion 26a of the pin 26 protrudes into the pressurized gas chamber 20, and the protruding portion has a length such that the combustion gas flow from a gas generating agent molded article 36 collides with the protruding portion. By adjusting the length of the protruding portion of the pin 26, it is possible to cause the combustion gas to collide with the pin 26 itself and cause the adhesion of combustion residues to the pin. In the configuration shown in FIG. 1, the distal end portion 26a of the pin 26 can be extended to abut on an opposing wall surface 22a.

The gas generator 30 includes an ignition device (electric igniter) 34 and the gas generating agent molded article 36 accommodated inside the gas generator housing 32, and the gas generator is connected to one end of the pressurized gas chamber 20. The space charged with the gas generating agent molded article 36 serves as a combustion chamber 35. The gas generator housing 32 and the pressurized gas chamber housing 22 are resistance-welded at the joint portion 49. When the inflator 10 is incorporated in an airbag system, the ignition device 34 is connected by means of a connector and a conductive wire to an external power supply.

A known gas generating agent can be used as the gas generating agent molded article 36. The gas generating agent molded article 36 shown in the drawing has a columnar shape, and therefore, the minimum diameter (Dmin) is the diameter of the end surface.

A first communication passage 38 between the pressurized gas chamber 20 and the gas generator 30 is closed by a first rupture plate 40 that is deformed in a bowl-like shape due to the pressure of the pressurized gas, and the inside of the gas generator 30 is maintained at an ambient pressure. The first rupture plate 40 is resistance-welded to the gas generator housing 32 at the circumferential edge 40a.

The first rupture plate 40 is covered by a cup 44 from the pressurized gas chamber 20 side. The cup 44 is attached to cover the first rupture plate 40 (that is, the first communication passage 38), so that the combustion gas generated by combustion of the gas generating agent molded article 36 is necessarily ejected via the cup 44 from gas holes 42.

The cup 44 has a circular cross section, and a plurality of gas holes 42 are formed only in a circumferential surface 44a. A bottom surface 44b directly opposes the first rupture plate 40 (that is, the first communication passage 38).

The gas holes 42 formed in the circumferential surface 44a have a circular shape, and the diameter (dmin) thereof is equal to or less than the minimum diameter (Dmin) of the gas generating agent molded article 36, preferably less than the minimum diameter (Dmin) of the gas generating agent molded article 36.

In the cup bottom surface 44b, the distance (W) to the end portion of the gas hole 42a (see FIG. 1), which is positioned closest to the cup bottom surface 44b, and the minimum diameter (Dmin) of the gas generating agent molded article 36 preferably satisfy the relationship Dmin/2<W.

The cup 44 has a flange portion 46 obtained by bending outwardly the circumferential edge portion of the opening, and the cup is fixed by crimping one part (crimping portion) 48 of the gas generator housing 32 at the flange portion 46.

Figure 2:
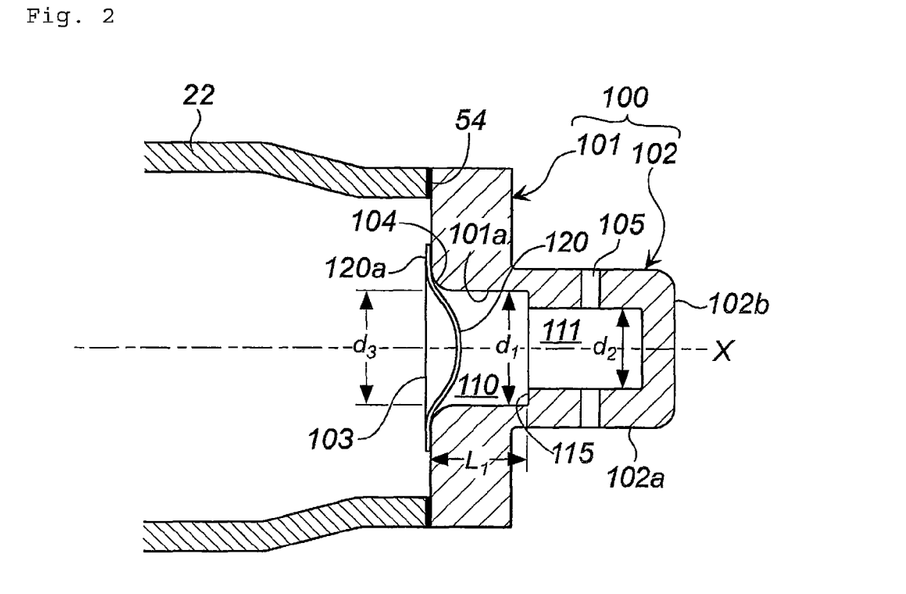
FIG. 2 shows an axial sectional view of the diffuser portion that can be connected to the gas generator shown in FIG. 1.

The diffuser portion 100 having a gas discharge port 105 for discharging the pressurized gas and combustion gas is connected, as shown in FIG. 2, to the other end of the pressurized gas chamber 20. The diffuser portion 100 and the pressurized gas chamber housing (main housing) 22 are resistance-welded at a joint portion 54.

The diffuser portion 100 may have a cup-like shape having an opening 103 and a circumferential wall portion 102a, but from the standpoint of joining to the pressurized gas chamber housing 22, it is preferred that, as shown in FIG. 2, the diffuser portion has an annular portion 101 and a gas discharge portion 102. The annular portion 101 has the opening 103 and is joined to the main housing 22 at the joint portion 54. The gas discharge portion 102 has a circumferential wall portion 102a that protrudes from the inner circumferential edge of the annular portion 101 and includes a plurality of gas discharge ports 105, and a bottom surface portion 102b.

The gas discharge port 105 is formed in the circumferential wall portion 102a of the cup-shaped gas discharge portion 102, but may be also formed in the bottom surface portion 102b.

The number of gas discharge ports 105 is not particularly limited, but it is preferred that four or more gas discharge ports of a predetermined size be formed.

A circular partition plate (second rupture plate) 120 closes between the housing main body 22 and the diffuser portion 100. The circular partition plate 120 is made from a stainless steel and fixedly attached to the opening 103 of the annular portion 101. Prior to the attachment, the partition plate 120 has a disk-like shape, but it is deformed to project in a bowl-like manner to the diffuser portion 100 side upon receiving the pressure of the pressurized gas inside the main housing 22.

In the partition plate 120, the circumferential edge portion 120a is fixed by welding to the circumferential edge (surface of the annular portion 101 facing the main housing 22) of the opening 103 of the annular portion 101.

A corner portion 104 facing the opening 103 of the annular portion 101 is preferably a curved surface as shown in the drawing. When the corner portion 104 is a curved surface, petal-like cleavage of the partition plate 120 during actuation is enhanced and pulverization of the partition plate 120 and formation of chips are prevented.

The inside of the diffuser portion 100 has a first tubular space portion 110 facing the partition plate 120 and a second tubular space portion 111 communicating with the gas discharge port 105, and the two space portions are arranged side by side in the axial direction of the diffuser portion 100 and communicate with each other.

The central axis X of the first tubular space portion 110 coincides with the central axis X of the second tubular space portion 111.

The first tubular space portion 110 and the second tubular space portion 111 are communicated with each other and provided with a step 115 being formed therebetween, so that the inner diameter d1 of the first tubular space portion 110 and the inner diameter d2 of the second tubular space portion 111 satisfy the relationship d1>d2.

From the standpoint of adjusting width of the step 115, it is preferred that the ratio (d1/d2) of d1 and d2 be within a range of 1.5 to 8, more preferably within a range of 1.8 to 5.

The width of the step 115 can be determined from (d1−d2)/2, and when d1 is 7 mm, the width is preferably within a range of 1.4 to 1.8 mm.

The cross-sectional area (cross-sectional area in the diametric direction) a1 of the second tubular space portion 111 with the inner diameter d2 is set to be less than the total opening area a2 of the plurality of gas discharge ports 105.

As for the cross-sectional area of the second tubular space portion 111 with the inner diameter d2 and the cross-sectional area (cross-sectional area in the diametrical direction) of the first tubular space portion 110 with the inner diameter d1, since d1>d2, the cross-sectional area of the second tubular space portion 111 is smaller.

When the partition plate 120 is ruptured, the pressurized gas located inside the housing main portion 22 is discharged from the gas discharge ports 105 via the first tubular space portion 110 and the second tubular space portion 111. Therefore, the second tubular space portion 111 serves as a choke portion in the flow-out path of the gas flow.

The ratio (a1/a2) of a1 and a2 is preferably within a range of 0.3 to 0.9, more preferably within a range of 0.4 to 0.8.

Since the inner diameter d2 of the second tubular space portion 111 is sufficiently larger than the inner diameter of a single gas discharge port 105 (in the present embodiment, by about 1.4 times as large as), the ratio of machining tolerance is smaller than that in the case where small gas discharge ports 105 are drilled or punched. Further, since only one second tubular space portion 111 is provided, machining tolerance of the second tubular space portion 111 can be decreased by comparison with the total machining tolerance for the plurality (preferably, four or more) of gas discharge ports 105 formed by being drilled or punched.

Therefore, where a single second tubular space portion 111 is used as a choke portion, the adjustment function of gas discharge amount can be brought closer to that as it is (that is, the variation of output performance of gas generator can be reduced) than in the case in which the plurality of gas discharge ports 105 are used as a choke portion.

The length L1 of the first tubular space portion 110 (length from the opening 103 of the first tubular space portion 110 facing the partition plate 120 to the step 115) and the inner diameter d1 of the first tubular space portion 110 satisfy the relationship L1>0.5d1.

Where such a relationship is satisfied, when the partition plate 120 is petal-like cleaved during actuation, the cleaved tips are prevented from reaching the second tubular space portion 111.

In order to facilitate such petal-like cleavage of the partition plate 120, a plurality of weak portions can be formed radially from the central portion of the partition plate.

The partition plate 120 is fixed by welding to the circumferential edge of the opening 103 of the annular portion 101 at the circumferential edge portion 120a, and the corner portion 104 facing the opening 103 is curved as shown in the drawing. Therefore, the diameter (d3) of the portion of the partition plate 120 that faces the first tubular space portion 110 is not exactly equal to the inner diameter d1 of the first tubular space portion 110, but is substantially equal thereto to the degree for assurance of the above-described mechanism.

The operation will be explained below with respect to the case where the inflator in which the diffuser portion 100 shown in FIG. 2 is fixed by welding to the inflator 10 shown in FIG. 1 is incorporated in an airbag system installed on an automobile.

When an automobile receives an impact in the event of collision, an igniter 34 is actuated by an actuation signal output means, the gas generating agent molded article 36 located inside the combustion chamber 35 is ignited, and high-temperature combustion gas is generated.

Then, the first rupture plate 40 is ruptured and the first communication passage 38 is opened by the increase in pressure inside the gas generator 30 caused by the high-temperature combustion gas. As a result, the combustion gas flows into the cup 44 and is ejected from the gas hole 42 into the pressurized gas chamber 20.

The partition plate (second rupture plate) 120 is then ruptured and petal-like cleaved, and the gas discharge path is opened by the increase in pressure inside the pressurized gas chamber 20. Therefore, the pressurized gas and combustion gas are discharged from the plurality of gas discharger port 105 via the first tubular space portion 110 and the second tubular space portion 111 and the airbag is inflated.

Figure 3:
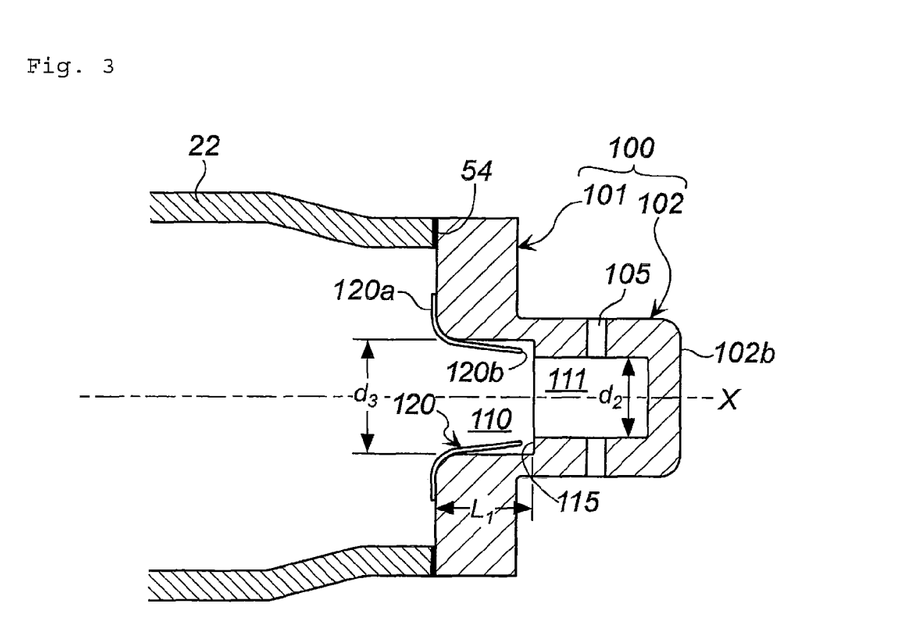
FIG. 3 illustrates the operation of the gas generator in accordance with the present invention.

When the partition plate 120 in the state shown in FIG. 2 is petal-like cleaved as shown in FIG. 3 in the abovementioned operation, the circumferential edge portion 120a of the partition plate 120, that is fixedly attached to the circumferential edge (surface of the annular portion 101 facing the main housing 22) of the opening 103, remains as is, but a distal end portion 120b of the petal-like cleaved portion expands toward the second tubular space portion 111.

However, since the relationship L1>0.5d1 is satisfied, the distal end portion 120b does not reach the second tubular space portion 111 over the step 115. Further, the distal end portion 120b of the petal-like cleaved portion can be close to or into contact with the inner wall surface 101a of the annular flat plate 101 by adjusting the d1/d2 ratio (width of the step 115). Therefore, the cleaved portion is prevented from protruding in the central axis X direction of the first tubular space portion 110 and substantially changing the cross-sectional area a1 of the second tubular space portion 111.

As a result, the condition a1<a2 is maintained and the second tubular space portion 111 functions as the choke portion, thereby making it possible to obtain the function of adjusting the designed gas flow rate.

Further, when the gas generating agent molded article 36, that is being combusted or yet to be combusted, is present inside the combustion chamber 35 in the abovementioned operation, the molded body is carried by the gas flow and discharged into the cup 44 through the opened first communication passage 38. The gas generating agent molded article 36 that is being combusted or yet to be combusted collides with the cup bottom surface 44b and is trapped thereby.

The gas generating agent molded article 36, that is being combusted or yet to be combusted, is thus prevented from being discharged from the gas holes 42 of the cup 44, and the gas generating agent molded article 36 is completely burnt before reaching the inside of the pressurized gas chamber 20. Therefore, the designed output can be stably obtained.

(2) Pyrotechnic-Type Inflator

A pyrotechnic-type inflator 150 shown in FIG. 4 will be explained below.

The pyrotechnic-type inflator 150 has a gas generation chamber 164 surrounded by a gas generation chamber housing 160, a first diffuser portion 200, and a second diffuser portion 170.

The gas generation chamber 164 is charged with a predetermined amount of a gas generating agent 162, and an igniter 161 for causing ignition and combustion of the gas generating agent 162 is attached to the gas generation chamber housing 160.

A screen (wire mesh) 163, for preventing the gas generating agent 164 from moving toward a first diffuser portion 200, is disposed between the gas generation chamber 164 and the first diffuser portion 200.

The first diffuser portion 200 is connected to the gas generation chamber 164, and the first diffuser portion 200 and the gas generation chamber housing 160 are resistance-welded together at a joint portion 154.

The first diffuser portion 200 has an annular portion 201 and a gas discharge portion 202. The annular portion 201 is joined to the joint portion 154 of the gas generation chamber housing 160. The gas discharge portion 202 is provided with a circumferential wall portion 202a that protrudes from the inner circumferential edge of the annular portion 201 and is provided with a plurality of first gas discharge ports 205, and a bottom surface portion 202b.

A circular partition plate (rupture plate) 220 closes between the first diffuser portion 200 and the gas generation chamber housing 160. The circular partition plate (rupture plate) 220 is made from a stainless steel and fixedly attached to the opening 203 of the annular portion 201.

In the partition plate 220, the circumferential edge portion 220a is fixed by welding to the circumferential edge (surface of the annular portion 201 facing the gas generation chamber 164) of the opening 203 of the annular portion 201.

The partition plate 220 is used for moisture-proofing of the gas generating agent 160 and may be lower in strength than the partition plate 120 shown in FIGS. 1 to 3. A material other than the stainless steel may be also used, provided that the aforementioned purpose is accomplished.

The inside of the first diffuser portion 200 has a first tubular space portion 210 facing the partition plate 220 and a second tubular space portion 211 communicating with the first gas discharge port 205, and the two space portions are in communication with each other in the central axis X direction.

The central axis X of the first tubular space portion 210 coincides with the central axis X of the second tubular space portion 211.

The first tubular space portion 210 and the second tubular space portion 211 are communicated with each other and forms a step 215 therebetween, so that the inner diameter d1 of the first tubular space portion 210 and the inner diameter d2 of the second tubular space portion 211 satisfy the relationship d1>d2.

From the standpoint of adjusting width of the step 215, it is preferred that the ratio (d1/d2) of d1 and d2 be within a range of 1.5 to 8, more preferably within a range of 1.8 to 5.

The width of the step 215 can be determined from (d1−d2)/2, and when d1 is 7 mm, the width is preferably within a range of 1.4 to 1.8 mm.

The cross-sectional area (cross-sectional area in the diametrical direction) a1 of the second tubular space portion 211 with the inner diameter d2 is set to be less than the total opening area a2 of the plurality of first gas discharge ports 205.

As for the cross-sectional area of the second tubular space portion 211 with the inner diameter d2 and the cross-sectional area of the first tubular space portion 210 with the inner diameter d1, since d1>d2 is satisfied, the cross-sectional area of the second tubular space portion 211 is smaller.

When the partition plate 220 is fractured by the increase in pressure, the combustion gas generated in the gas generation chamber 164 is discharged from the first gas discharge ports 205 via the first tubular space portion 210 and the second tubular space portion 211. Therefore, the second tubular space portion 211 serves as a choke portion in the flow-out path of the gas flow.

The ratio (a1/a2) of a1 and a2 is preferably within a range of 0.3 to 0.9, more preferably within a range of 0.4 to 0.8.

Since the inner diameter d2 of the second tubular space portion 211 is sufficiently larger than the inner diameter of a first gas discharge port 205 (in the present embodiment, by about 1.4 times as large as), the ratio of machining tolerance is smaller than that in the case where small first gas discharge ports 205 are drilled or punched. Further, since only one second tubular space portion 211 is provided, machining tolerance of the second tubular space portion 211 can be decreased by comparison with the total machining tolerance for the plurality (preferably, four or more) gas discharge ports 205 formed by being drilled or punched.

Therefore, where a single second tubular space portion 211 is used as a choke portion, the adjustment function of gas discharge amount can be brought closer to that as it is than in the case in which the plurality of gas discharge ports 205 are used as a choke portion.

The length L1 of the first tubular space portion 210 (length from the opening 203 of the first tubular space portion 210 facing the partition plate 220, to the step 215) and the inner diameter d1 of the first tubular space portion 210 satisfy the relationship L1>0.5d1.

Where such a relationship is satisfied, when the partition plate 220 is petal-like cleaved during actuation, the cleaved tips are prevented from reaching the second tubular space portion 211.

In order to facilitate such petal-like cleavage of the partition plate 220, a plurality of weak portions can be formed radially from the central portion of the partition plate.

Similarly to the partition plate 120 shown in FIG. 2, in a certain attachment state of the partition plate 220 to the circumferential edge of the opening 203 of the annular portion 201, the diameter d3 of the portion of the partition plate 220 that faces the first tubular space portion 210 is not exactly equal to the inner diameter d1 of the first tubular space portion 210, but is substantially equal thereto to the degree for assurance of the above-mentioned mechanism.

A second diffuser portion 170 is further connected to the first diffuser portion 200.

The second diffuser portion 170 has a plurality of second gas discharge ports 173 in the circumferential surface. The total opening area of the plurality of second gas discharge ports 173 is larger than the total opening area a2 of the plurality of first gas discharge ports 205.

A tubular coolant/filter 171 for cooling and filtering the combustion gas is disposed inside the second diffuser portion 170.

Figure 4:
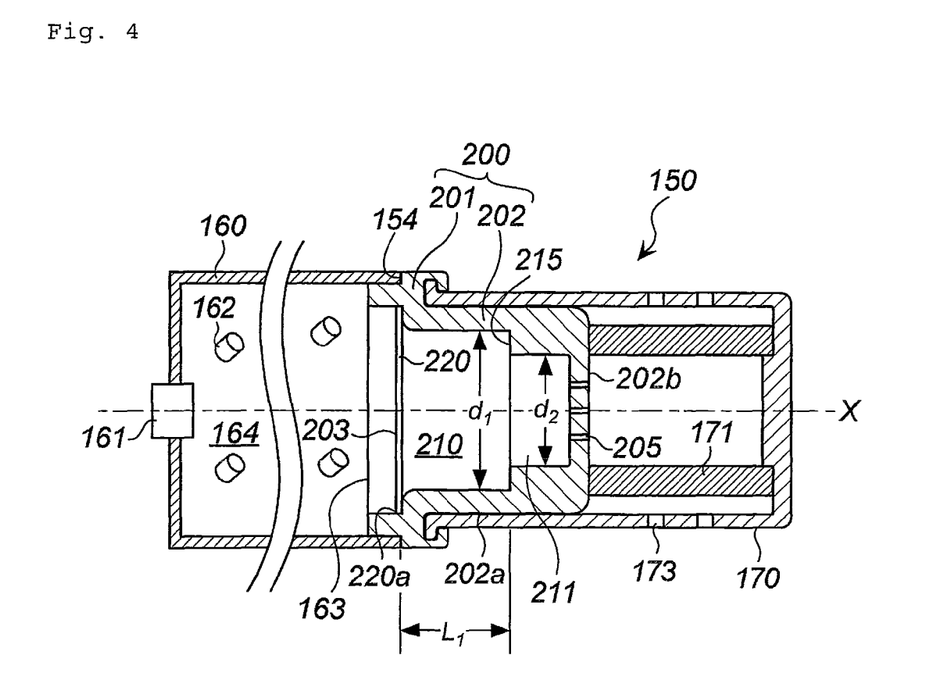
FIG. 4 shows an axial sectional view of the gas generator of another embodiment of the present invention.

The operation will be explained below with respect to the case where the pyrotechnic-type inflator 150 shown in FIG. 4 is incorporated in an airbag system installed on an automobile.

When an automobile receives an impact in the event of collision, an igniter 161 is actuated by an actuation signal output means, the gas generating agent 162 located inside the gas generation chamber 164 is ignited, and high-temperature combustion gas is generated.

Then, the partition plate 220 is ruptured and petal-like cleaved, and the gas discharge path is opened by the increase in pressure inside the gas generation chamber 164 caused by the high-temperature combustion gas. As a result, the combustion gas is discharged from the plurality of gas discharge ports 205 into the second diffuser portion 170 via the first tubular space portion 210 and the second tubular space portion 211, cooled and filtered by the coolant/filter 171, and then discharged from the second gas discharge ports 173 to inflate the airbag.

When the partition plate 220 is petal-like cleaved in the abovementioned operation, the circumferential edge portion 220a of the partition plate 220, that is fixedly attached to the circumferential edge (surface of the annular portion 201 facing the gas generation chamber 164) of the opening 203, remains as is, but a distal end portion of the petal-like cleaved portion expands toward the second tubular space portion 211.

However, since the relationship L1>0.5d1 is satisfied, the distal end portion does not reach the second tubular space portion 211 over the step 215. Further, the distal end portion of the petal-like cleaved portion can be close to or into contact with the inner wall surface of the first tubular space portion 210 by adjusting the d1/d2 ratio (the width of the step 215). Therefore, the cleaved portion is prevented from protruding in the central axis X direction of the second tubular space portion 211 and substantially changing the cross-sectional area a1 of the second tubular space portion 211.

As a result, the condition a1<a2 is maintained and the second tubular space portion 211 functions as the choke portion, thereby making it possible to obtain the function of adjusting the designed gas flow amount adjustment.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
 a main housing accommodating at least one of a gas and a gas generating means for generating a gas;
 a diffuser portion connected to the main housing and discharging a gas located inside the main housing or a gas generated inside the main housing,
the diffuser portion having a cup-like shape and including an opening portion joined to the main housing and a circumferential wall portion provided with a plurality of gas discharge ports;
 a partition plate fixedly attached to an annular portion on a side of the opening portion and closing the opening portion,
 an inside of the diffuser portion having a first tubular space portion and a second tubular space portion communicating with each other,
 the first tubular space portion facing the partition plate, and the second tubular space portion communicating with the gas discharge ports,
 the first tubular space portion and the second tubular space portion being communicated with each other and provided with a step such that an inner diameter d1 of the first tubular space portion and an inner diameter d2 of the second tubular space portion satisfy a relationship d1>d2,
 a cross-sectional area a1 of the second tubular space portion having the inner diameter d2 is set to be smaller than a total opening area a2 of the gas discharge ports, and
 the opening portion being defined by a curved surface, such that when the partition plate is petal-like cleaved during actuation of the gas generator, the curved surface prevents that partition plate from breaking away.

2. The gas generator according to claim 1, wherein a length of the first tubular space portion L1 from the opening portion in the first tubular space portion facing the partition plate, to the step and the inner diameter of the first tubular space portion d1 satisfy a relationship L1>0.5d1, such that cleaved plates of the partition plate are prevented from reaching the second tubular portion.

3. The gas generator according to claim 2, wherein the partition plate has a plurality of weak portions formed radially from a central portion thereof.

4. The gas generator according to claim 1, wherein the partition plate has a plurality of weak portions formed radially from a central portion thereof.

5. The gas generator according to claim 1, wherein the ratio d1/d2 of d1 and d2 is within a range of 1.5 to 8.

6. The gas generator according to claim 1, wherein the ratio a1/a2 of a1 and a2 is within a range of 0.3 to 0.9.

7. The gas generator according to claim 1, wherein the gas generator is a stored-gas-type inflator that uses the gas filled in the main housing.

8. The gas generator according to claim 1, wherein the gas generator is a hybrid-type inflator that uses the gas and a gas generating agent charged in the main housing.

9. The gas generator according to claim 1, wherein the gas generator is a pyrotechnic-type inflator that uses a gas generating agent charged in the main housing.

* * * * *